No. 610,922. Patented Sept. 20, 1898.
W. J. SAGER.
SAP SPOUT.
(Application filed Mar. 30, 1898.)
(No Model.)
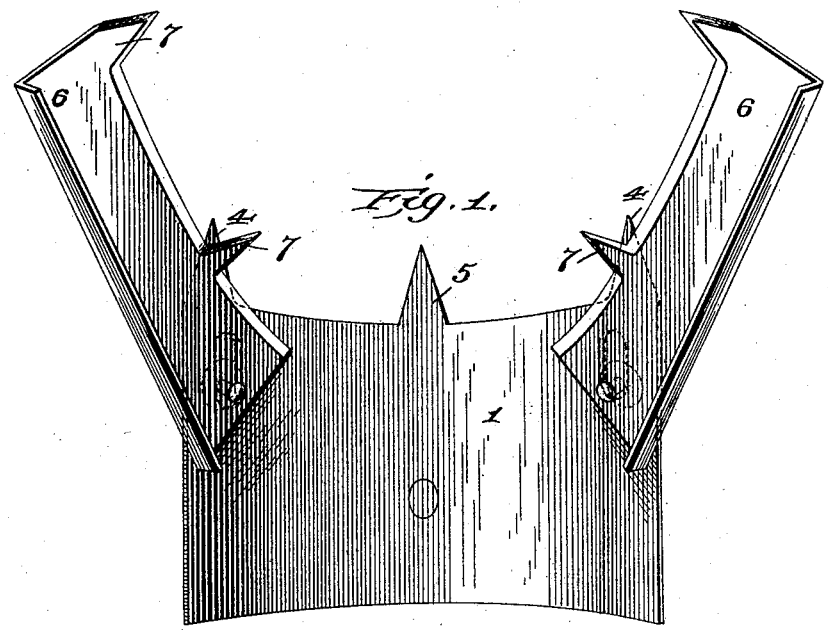
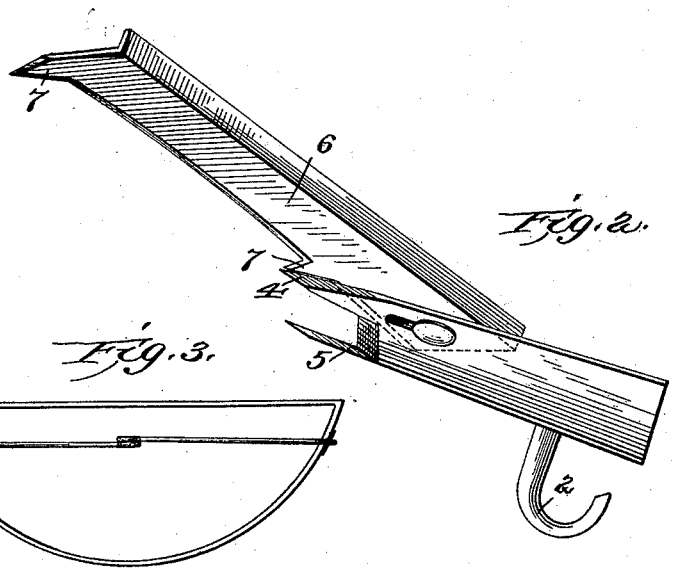
Attest
C. S. Middleton
Wm. F. Hall
Inventor
William J. Sager
by Walter Donaldson & Co.
Attys.
THE NORRIS PETERS CO., PHOTO-LITHO., WASHINGTON, D. C.

UNITED STATES PATENT OFFICE.

WILLIAM J. SAGER, OF WARREN, PENNSYLVANIA.

SAP-SPOUT.

SPECIFICATION forming part of Letters Patent No. 610,922, dated September 20, 1898.

Application filed March 30, 1898. Serial No. 675,664. (No model.)

*To all whom it may concern:*

Be it known that I, WILLIAM J. SAGER, a citizen of the United States, residing at Warren, Warren county, Pennsylvania, have invented certain new and useful Improvements in Sap-Spouts, of which the following is a specification.

My invention relates to means for gathering sap from trees, and particularly turpentine; and it comprises the spout adapted to be readily secured to the tree, said spout having laterally-adjustable arms pivoted thereto and adapted to embrace the tree.

In the accompanying drawings, Figure 1 is a plan view of the invention; Fig. 2, a perspective view from the side, and Fig. 3 illustrates the form of bucket to be used with the spout.

The spout 1 consists of a curved plate, of metal or like material, the curve being sufficient to form a channel to direct the sap into the bucket, which is suspended from the hook 2 on the lower side of the spout. The rear edge of the spout is sharpened, so that it will embed itself in the tree, and it is curved to conform approximately to the periphery of the tree. It is also provided with a spur or attaching-point 4 at each rear corner and a third spur 5 at the center of its curved edge, these spurs being adapted to penetrate the tree and hold the spout in place.

Pivoted to the rear corners of the spout are lateral wings 6, each of which consists of a comparatively narrow strip of metal having a flange along its outer edge to direct the sap to the main part of the spout. The inner edges of these wings are curved slightly and sharpened to cut into the tree, and they are likewise provided with spurs 7 to penetrate the tree, and thus hold the spout in place. These wings, being pivotally connected to the main spout, may be adjusted to fit trees of various sizes, and to aid in this adjustment the pivots consist of rivets passing through slots in the main portion, so that the pivoted end of the wing may be moved toward and from the tree. These wings, being secured to the concaved or curved sides of the main part of the spout, incline upwardly in relation thereto when set at an angle to the main part, which position they must assume when the device is put in place, and the sap will therefore move downwardly along these inclines onto the main part. The bucket may be of the form shown in Fig. 3, having one side flattened, so that it may be suspended in the limited space between the hook and the tree.

I claim as my invention—

1. In combination, in a sap-spout, the main part 1, and a pair of wings located at the rear corners of said main part and having pivotal movement laterally in relation thereto, the said parts being adapted for adjustment to a tree and the wings being adapted to fit trees of different diameter, substantially as described.

2. In combination in a sap-spout with the curved main part 1, a pair of wings having a slot-and-pin connection at the rear corners of said main part, the said wings being laterally adjustable in relation to the main part and inclining upwardly therefrom, substantially as described.

In testimony whereof I affix my signature in presence of two witnesses.

WILLIAM J. SAGER.

Witnesses:
F. H. YOUNG,
A. J. CROPPS.